US009729652B2

(12) United States Patent
Shahpurwala et al.

(10) Patent No.: US 9,729,652 B2
(45) Date of Patent: Aug. 8, 2017

(54) DYNAMICALLY AFFINITIZING USERS TO A VERSION OF A WEBSITE

(71) Applicant: Microsoft Corporation, Redmond, WA (US)

(72) Inventors: Shabbir Shahpurwala, Sammamish, WA (US); Amar Shroff, Bellevue, WA (US); Shardul Vikram, Bellevue, WA (US); Derek Tsuchida, Kirkland, WA (US); Sergio Ligregni, Bellevue, WA (US); Joel Scaria, Kirkland, WA (US); Kyle Richey, Kirkland, WA (US); Baskaran Dharmarajan, Palo Alto, CA (US); Parker Shelton, Santa Clara, CA (US); Archana Manoj Gadkari, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 340 days.

(21) Appl. No.: 13/867,289

(22) Filed: Apr. 22, 2013

(65) Prior Publication Data

US 2014/0317289 A1    Oct. 23, 2014

(51) Int. Cl.
*G06F 15/16* (2006.01)
*H04L 29/08* (2006.01)
(Continued)

(52) U.S. Cl.
CPC .......... *H04L 67/28* (2013.01); *G06F 17/3089* (2013.01); *H04L 67/02* (2013.01);
(Continued)

(58) Field of Classification Search
CPC .... H04L 67/025; H04L 67/10; H04L 67/1002
See application file for complete search history.

(56) References Cited

U.S. PATENT DOCUMENTS

| 5,872,972 A | 2/1999 | Boland |
| 6,947,992 B1 | 9/2005 | Shachor |

(Continued)

OTHER PUBLICATIONS

Using the Application Request Routing Module—Retrieved Date: Mar. 5, 2013, pp. 4, http://www.iis.net/learn/extensions/planning-for-arr-using-the-application-request-routing-module.

(Continued)

*Primary Examiner* — Douglas Blair
(74) *Attorney, Agent, or Firm* — Schwabe, Williamson & Wyatt P.C.

(57) ABSTRACT

Systems and methods for providing user's access to a particular version of an electronic resource (e.g., a website, web resource or the like) where versions of such electronic resources are stored across a set of servers are disclosed. In one embodiment, user's requests may be received—either requesting a particular version or as an unversioned request. A version control module (for example, a load balancer) may receive these requests and assign the user's request to a first server according to different metrics, e.g., regarding version control rules and/or effective load balancing considerations. If the initial server assigned is not able to handle the user's request, the user's request may be proxied to another server, according to different metrics. If there is no server that may handle the user's request (after a certain number of proxied requests), the request may be returned to the user as not handled.

20 Claims, 5 Drawing Sheets

(51) Int. Cl.
*G06F 17/30* (2006.01)
*H04L 12/24* (2006.01)
(52) U.S. Cl.
CPC ........ *H04L 67/2814* (2013.01); *H04L 67/327* (2013.01); *H04L 41/082* (2013.01); *H04L 67/306* (2013.01)

(56) References Cited

U.S. PATENT DOCUMENTS

| | | | | |
|---|---|---|---|---|
| 6,996,615 | B1 * | 2/2006 | McGuire | G06F 9/505 709/224 |
| 7,380,003 | B1 * | 5/2008 | Guo | G06F 17/3089 709/203 |
| 8,352,852 | B2 * | 1/2013 | Heute | G06F 17/2288 715/229 |
| 8,391,295 | B2 | 3/2013 | Colrain | |
| 8,650,156 | B1 * | 2/2014 | McHugh | G06F 17/30194 707/638 |
| 8,849,825 | B1 * | 9/2014 | McHugh | G06F 17/3023 707/737 |
| 9,137,165 | B2 | 9/2015 | Anand | |
| 2002/0010783 | A1 * | 1/2002 | Primak et al. | 709/228 |
| 2006/0075398 | A1 * | 4/2006 | Bennett | G06F 8/61 717/170 |
| 2007/0026373 | A1 * | 2/2007 | Suriyanarayanan | G06F 8/00 434/322 |
| 2007/0198710 | A1 * | 8/2007 | Gopalakrishnan | H04L 67/06 709/225 |
| 2009/0013010 | A1 * | 1/2009 | Fang | H04L 67/02 |
| 2009/0034537 | A1 * | 2/2009 | Colrain et al. | 370/400 |
| 2009/0313335 | A1 * | 12/2009 | Heidasch | 709/206 |
| 2010/0058451 | A1 | 3/2010 | Paramasivam | |
| 2010/0332664 | A1 * | 12/2010 | Yevmenkin | H04L 29/12405 709/227 |
| 2011/0041055 | A1 * | 2/2011 | Heute | G06F 17/2288 715/243 |
| 2011/0276884 | A1 | 11/2011 | Marcjan | |

OTHER PUBLICATIONS

Release Engineering at Facebook—Retrieved Date: Mar. 5, 2013, pp. 4, http://server.dzone.com/articles/release-engineering-facebook.

About Affinity Groups for Virtual Network—Retrieved Date: Mar. 5, 2013, pp. 2, http://msdn.microsoft.com/en-us/library/windowsazure/jj156085.aspx.

ARR as generic proxy in Hotmail and SkyDrive—Retrieved Date: Apr. 1, 2013, Author: Amar Shroff, pp. 4, http://www.iis.net/learn/extensions/configuring-applications-request-routing-(arr)/arr-as-generic-proxy-in-hotmail-and-skydrive.

* cited by examiner

DYNAMICALLY AFFINITIZING USERS TO A VERSION OF A WEBSITE

BACKGROUND

Oftentimes, websites and web-based services are updated to provide new services, different service, different data and the like to users and/or customers. These updates are often performed under versioning control—e.g., from Version 1 to Version 2. During a front end deployment, it is typically desirable that a user should not see the older version of the website if the user has already seen the newer version. In the past, websites may have: (a) deployed 50% of their environment at a time so that no two versions are available for any given single request, (b) maintained the last version of the user saw in a back end store, or (c) been comfortable with users moving between website versions.

During internal testing, users typically go to a "special" URL to hit beta code. This may tend to be complicated for web services since users/clients making calls to endpoints must be aware of all the beta environments. It may also be challenging to add value without introducing additional overhead when adding additional vertical environment stacks (e.g., additional beta environments).

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and methods for providing user's access to a particular version of an electronic resource (e.g., a website, web resource or the like) where versions of such electronic resources are stored across a set of servers are disclosed. In one embodiment, user's requests may be received—either requesting a particular version or as an unversioned request. A version control module (for example, a load balancer) may receive these requests and assign the user's request to a first server according to different metrics, e.g., regarding version control rules and/or effective load balancing considerations. If the initial server assigned is not able to handle the user's request, the user's request may be proxied to another server, according to different metrics. If there is no server that may handle the user's request (after a certain number of proxied requests), the request may be returned to the user as not handled.

In one embodiment, a method for managing access to versions of an electronic resource accessible to users via a network is disclosed, comprising: receiving electronic resource metadata, said electronic resource being stored in a plurality of versions across a network at one or more servers within said network; receiving user metadata, said users authorized access to said electronic resource, said user metadata comprising metadata regarding which versions said user are allowed to have access; receiving a user's request for access to said electronic resource; determining a first server to send said user's request for access said electronic resource to respond to said user's request, according to a set of first metrics; and if said first server determines that it may not be able to handle said user's request, redirecting said user's request to a second server, according to a set of second metrics.

In another embodiment, A system for managing access to versions of an electronic resource is disclosed, comprising: a load balancer, said load balancer in communication with a set of servers, said servers comprising versions of an electronic resource; said load balancer further partitioned into a plurality of versioned Virtual IPs (VIPs); said versioned VIP associated with a version of said electronic resource; and further wherein said load balancer capable of receiving user's request for access to said electronic resource, determining a version of said electronic resource for user to access, and assigning said user's request to a first server hosting said version of said electronic resource.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
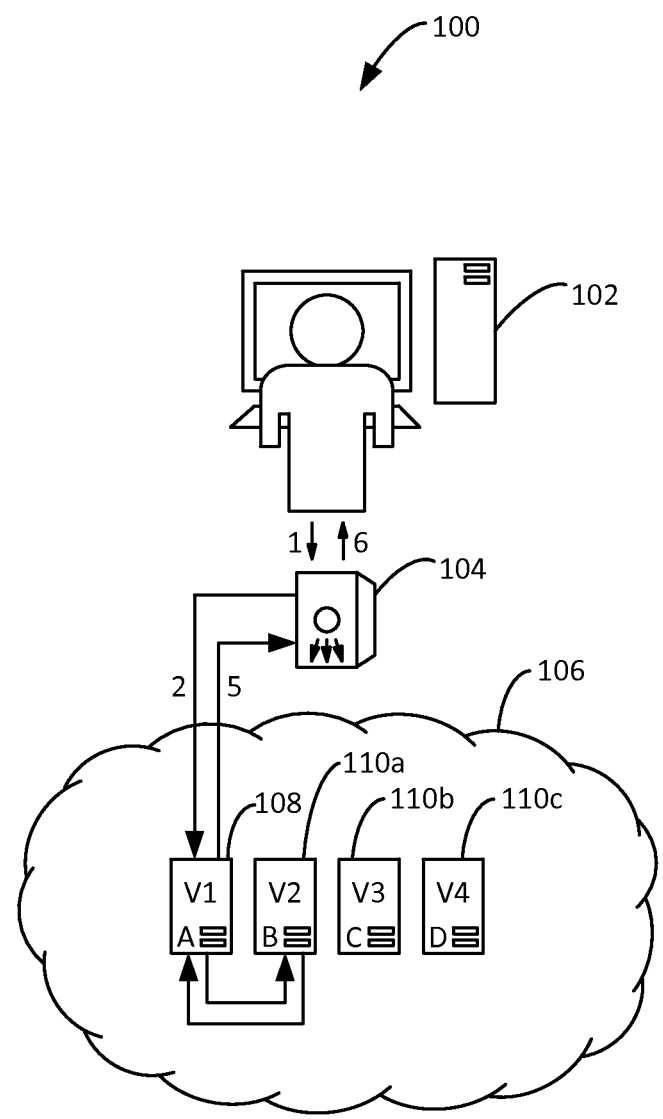
FIG. 1 depicts one embodiment and exemplary environment of a server system as made in accordance with the principles of the present application

As utilized herein, terms "component," "system," "interface," "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

In many embodiments, systems and methods are presented that may be used to manage user access to electronic resource—as well as to affinitize and/or otherwise migrate a user—to a (possibly new) version of such electronic resource during a deployment. For the purposes of the present application, an electronic resource may be a computer resource (e.g., a web service, a website, a webpage, a database, an application or the like) to which users may have authorization to access. Such access may be accessible via a network, such as the Internet or some other network environment. Such electronic resources may have multiple versions available to the user—and such electronic resources may be in the process of being upgraded to a new and/or different version (such versions either externally or internally designated as such). Authorization may occur across a spectrum—e.g., from substantially no authentication (i.e., available to anyone with access to the network or Internet) to moderate-to-high levels of authorization (e.g. someone having paid access with a login and password needed for access).

In many of the embodiments presented herein, electronic resources may have associated metadata—e.g., possibly comprising: metadata that describes what versions are available, to whom the resources may have access, which versions are stored on which servers, load on particular servers and other access metrics. Users may also have associated metadata—e.g., possibly comprising: what resources users have access, what versions (including the last version) that users have accessed and the like. It should be appreciated that such resource and user metadata may be stored together or apart and may be stored in any datastores, databases and/or data structures that are known in the art. Such metadata may be received via a database lookup, receipt of, or presented as: a cookie, a query string, post parameter, a HTTP header or as any part of the URL such as the path as well—e.g., comprising such metadata and/or any other manner of receiving metadata known in the art.

Some embodiments described herein may perform effective load-balancing—e.g., between a first set of servers that are hosting a first version of a website and/or web services and a second set of servers that are hosting a second version of a website and/or web services. In some embodiments, such load balancing may be implemented via a proxy. In other embodiments, systems and methods are presented that may be used to affinitize a user to a version of a website for internal testing purposes.

FIG. 1 is one embodiment of the environment (100) in which the systems and/or methods of the present application may reside and/or operate. User 102 may be attempting to access websites and/or web services hosted on a set of servers 106—which may accessed via a networked configuration, e.g., the Internet or other known network configuration.

The techniques of the present application may be performed at potentially many points within a server system. For example, the present techniques may reside at the load balancer or, alternatively, at one or more servers within the server system. In FIG. 1, load balancer 104 may handle an initial user request. In this example, the server system may perform a mapping of such request onto a server upon which the desired version of the site the user's request is to be directed. Such mapping may be aided by the use of certain metrics—e.g., version control rules (e.g. rules regarding access, for example, "once a user has seen version n, user may not see any earlier version"), metrics regarding percentage of available current versions, metrics regarding load on particular servers hosting available current versions, metrics regarding upgrading of electronic resources and percentage load on such versions/servers, and the like. As noted in example of FIG. 1, server A (108) may be running Version 1—while servers B, C and D (110a, 110b, 110c respectively) may be running Version 2 of the site.

In one embodiment, user version control may be implemented by storing data associated with a user and particular version that is desired to present to the user. Such data may be maintained in any known data structure and/or database. In one embodiment, such data may be maintained by a set of metadata (e.g., cookies or the like).

In this example, user 102 may make a request (1) to the site with a metadata that says user 102 needs to see Version 2 of the site. This request, as noted, may be made via known protocol to access networked sites and/or services—e.g., via the Internet or the like. Load balancer 104 may send the request (2) to server A.

In this example, server A may realize that it does not have the version of the site the user should see. Server A may re-direct and/or proxy the request (3) to server B, which has the version that the user should see. Server B may process the request and send the response (4) back to Server A. Server A sends the response (5) it received from Server B back to load balancer 104. Finally, load balancer 104 sends that response back (6) to the user.

Load Balancer Embodiment

As mentioned, load balancer 104 may perform the techniques of the present application. In many embodiments, servers may be implemented to sit behind both versioned and unversioned VIPs ("Virtual IP") on the load balancer. In such a case, each server may be associated with two VIPs, a versioned one and an unversioned one. Requests that come directly from the user may go to the unversioned VIP—while proxied requests may come from the corresponding versioned VIP (possibly, according to the metrics mentioned herein).

Figure 2:
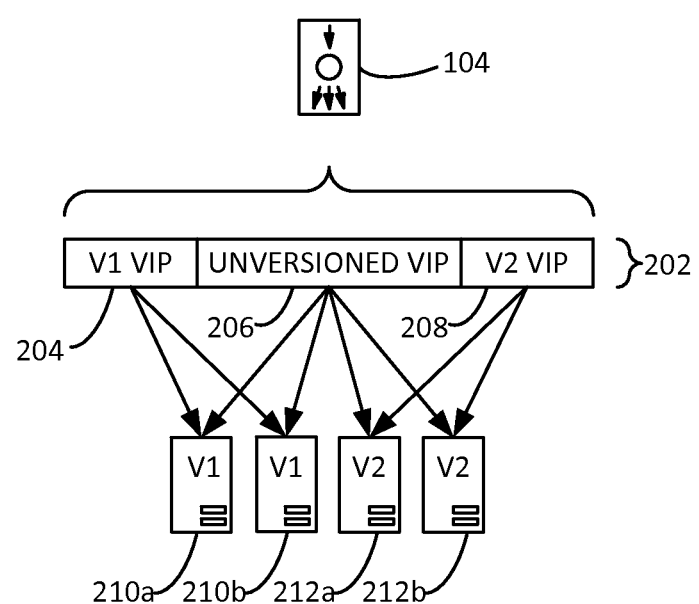
FIGS. 2 and 3 depict one embodiment of a load balancer and/or version control module made in accordance with the principles of the present application.
Figure 3:
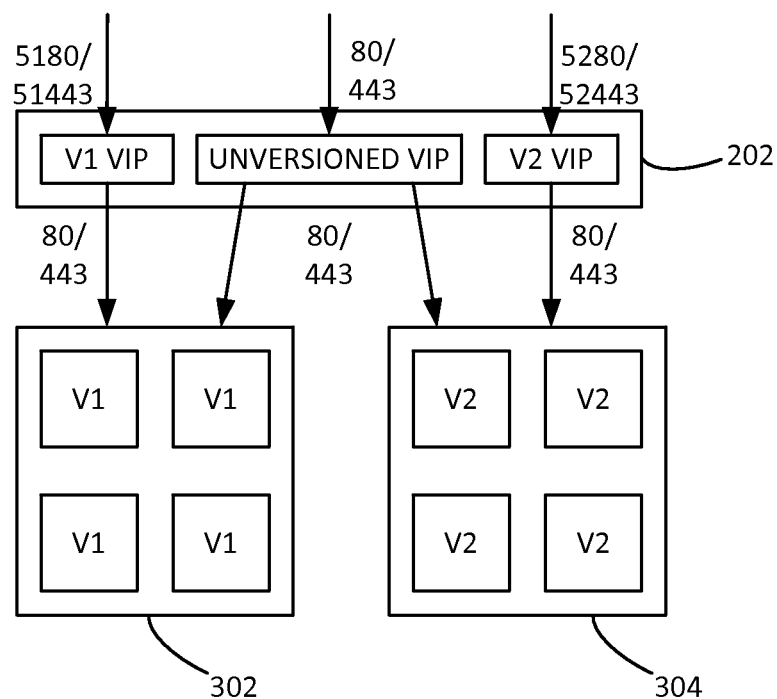

FIGS. 2 and 3 depict examples in which the load balancer 104 may receive user requests for sites and, upon certain data conditions present in the request and/or in a data store, will attempt to send requests for site access to desired versions of the site. In one embodiment, version control module 202 may receive such requests and decide which version of site (possibly according to the metrics mentioned herein) and, additionally, which servers host such version to handle such requests. Module 202 may be implemented e.g., as a proxy. Such a proxy may handle such requests over time in a "gradual deployment (GD)" fashion, as explained further herein.

Module 202 may be implemented in a partitioned fashion. For example, suppose there are two relevant versions of the site that exists for end users—e.g., V1 and V2. In this case, requests may be received that specify either V1 or V2—or request may come in that do not specify any particular version. In that case, V1 and V2 version requests may be handled by a V1 VIP ("Virtual IP") module 204 and V2 VIP module 208, respectively. Any requests that do not specify a version may be handled by an Unversioned VIP module 206. Once module 202 has decided upon which particular server to send the request, the requests will be assigned to one of the servers associated with module 202—e.g., V1 servers 210a, 210b or V2 servers 212a, 212b.

FIG. 3 depicts one particular example of the requests that may be received by version control module 202. As may be seen, requests that specify a particular version may have a particular prefix to the port request that is received. For example, requests for V1 may be received as requesting virtual ports 5180/51443; whereas requests for V2 may be received as requesting virtual ports 5280/52880. Unversioned requests may be made to port 80/443. Module 202 may make routing decisions and send forward requests to typical port 80/443 to e.g., server banks 302, 304 for either V1 or V2 servers, respectively. It will be appreciated that the present application encompasses more than two versions for other embodiments.

In one embodiment, it may be possible to implement a server system with a GD proxy using Internet Information Services' (IIS) ARR module, as follows. A request may come in to a server system. The system may geo-scale the request to one of server system's clusters by passing the call to the unversioned VIP for the chosen cluster (e.g.—via port 443). The unversioned VIP load balances the request to any machine in rotation.

The individual machine that handles the first request may proxy the call to any version group in any cluster, possibly including the one that it is a member of. It may also choose not to proxy the request at all and handle the call locally. To proxy a call, the source machine may use the URL, which specifies the cluster, and the port, which specifies the version. For example, all servers that can handle version 2 via e.g., 52443.

GD Proxy Embodiment

The following discussion may apply to the implementation to a module 202 designed as a GD proxy. In this embodiment, a user may make a HTTP request from a browser or a client. A load balancer (e.g. Akamai's Global Traffic Management (GTM), for merely one example) may service the request. If the request does not specify a particular version, then the request may be load balanced to one of system's clusters unversioned VIP.

The unversioned VIP may load balance the request to a single machine. If the request does not contain a valid version metadata (e.g., cookies or any other data and/or metadata) and the request is authenticated, then the GD proxy may calculate a user's version affinitization and the user's cluster by hashing the user's unique identifier across the number of possible cluster and version combinations.

In another embodiment, the GD proxy may calculate a user's bucket by hashing a user's unique identifier to a single bucket—and a user's cluster by hashing a user's unique identifier to a single bucket (e.g., if there are as many buckets as there are clusters). As used in the present application, a "bucket" is an atomic unit of version affinitization consisting of a number of users on the system. Buckets tend to be uniform in size and the number of buckets may vary in an implementation.

Each user version affinitization and user cluster combination (e.g., for example, each user bucket & user cluster combination) maps to a version of the website. This mapping may change dynamically as each individual machine in each cluster changes versions. Each individual machine is always aware of this mapping, which represents the version spread across all clusters.

If the request does not contain a valid version metadata and the request isn't authenticated, then the GD proxy compares a configured anonymous traffic threshold value with the spread of the various versions of the site available across all clusters. If the value is below the threshold, the user sees the oldest version of the website. If the value is above the threshold, the user sees the newest version of the website.

The server stamps the client with a version metadata with the version that the GD proxy determines the request should be handled by. At this point, the server handling the request knows what version of the website the request should be handled by.

The local server can handle the request if the request should be handled by the version of the site that the local server has and the user's bucket for the current cluster matches the version the request should be handled by.

If the local server can handle the request, it does. If the local server cannot handle the request, it proxies the request to the user's cluster versioned VIP. After a fixed number of proxies, which might happen if the user is hitting a moving target—the call fails.

In other embodiments, it may be desirable to identify the version the user needs to be routed to deterministically while load balancing traffic in an efficient manner. In addition, it may be desirable that the overall system have robust handling/routing that may dynamically change, depending on the state/health of the entire environment. The system may be able to effectively handle edge cases when servers become unhealthy.

It may also be desirable in some embodiments that the system guarantees (e.g., with a high probability) that a user who sees website version n will never see website version n-1.

For efficient handling, it may be desirable to eliminate a query to a back end store for the version of the site to show for a given user. In addition, it may be desirable to use Application Request Routing (ARR) to route internal traffic to the correct vertical stacks so that clients only need to be aware of a single endpoint.

Embodiments for Internal Testing

In some embodiments, it may be desirable to use the techniques of the present application for the purposes of internal testing (called "User Routing" herein) of effective version control and load balancing. In this case, a user may make an authenticated HTTP request from a browser or a client. The user routing proxy logic may be executed before the GD proxy logic, e.g., as described above.

In such an embodiment, the user routing proxy determines which vertical stack should handle the request. This can be determined by applying any deterministic function given the user's attributes. For example, there may be a unique value in the authentication header that describes which vertical stack should handle the request. The user routing proxy routes the request to another environment based on the value. If the target environment is being deployed, then the GD proxy logic is executed.

If the user routing logic determines that the current environment can handle the request and the current environment is being deployed, then the GD proxy logic is executed.

All environments may use the same link configuration but calls to second party servers (e.g., server to server) may be uniquely distinguished to keep the entire end to end call within the vertical stack.

Example Embodiment Depicting Effective Load Balancing with Version Control

Figure 4A:
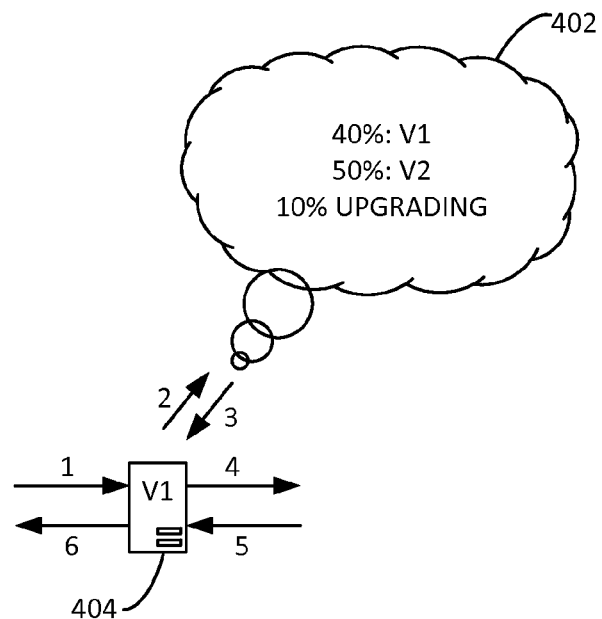
FIGS. 4A and 4B depict one example of the dynamic behavior of a server system as made in accordance with the principles of the present application.

To better understand the dynamic nature of the present application, some exemplary discussion will now be given. FIG. 4A depicts the use of metadata (e.g., cookies, query strings, post parameters, HTTP header, part of a URL) as datastores may be employed to aid in proper versioning control and/or effective load balancing. It should be appreciated, however, that the use of such metadata is merely one possible datastore that might suffice for the purposes of the present application. For example, data regarding users, particular versions afforded to particular users, servers having proper versions hosted and their relative usage may be implemented in other data storage—e.g., databases or the like.

As may be seen in FIG. 4A, a server (404) may receive an incoming request (1), possibly without associated version metadata. The server may check (2) the site version distribution in datastore 402 across all the servers, which may desirably be up to date. It should be appreciated that datastore 402 may be a central database in the server system or may be implemented in many other possible manners. The server may decide (3) that the request will get version 2. The server may proxy that request (4) to another server that has version 2 since it cannot handle the request. The server receives (5) the proxied response. The server returns (6) that response to the user.

As may be seen in FIG. 4A, part of the metadata used by the server system may be relative statistics regarding the percentage of servers serving particular versions or the percentage of the servers that are now under the process of upgrading version (and, therefore, possibly not accessible for user processes). Other statistics may be possible—e.g., the particular load that each server is currently seeing, the percentage of available computing, and/or storage capacity—for effective load balancing considerations.

Figure 4B:
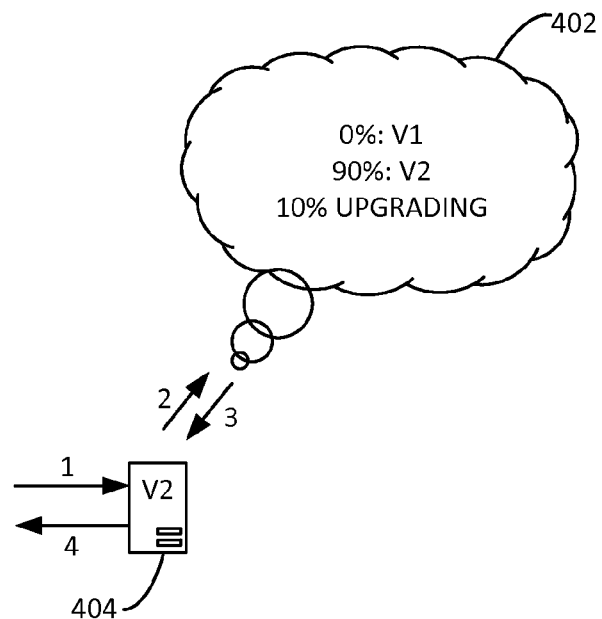

FIG. 4B depicts the server system of FIG. 4A but at a later point in time and different server system conditions. A server (404) receives an incoming request (1) with version metadata that says the user needs version 1 of the site. The server checks (2) the site version distribution across all the servers, which may be up to date. The server decides (3) that the request cannot get version 1 anymore and must get version 2 since there are no more servers with version 1. The server handles the request since it has version 2. It returns the response (4) to the user with new version metadata that says the user should get version 2 going forward.

Embodiment Using Application Request Routing (ARR)

In one embodiment, it is possible to use Application Request Routing (ARR) module as a generic proxy for web sites allowing both services to roll out updates to users without any disruption in service across different deployed versions.

The Application Request Routing proxy (ARR) may be employed for the gradual deployment system (GD) for upgrading web services, e.g., used to roll out new versions of our frontend services. GD incrementally moves blocks of users to the new version of the service as servers get upgraded. In one embodiment, it may be desirable for each user to experience the transition from the old to the new version at most once, while many users with shorter sessions will see no impact. To achieve this, users may be affinitized to a version of the service and requests may be proxied via ARR to a version-affinitized pool of servers. The system may be built to support both SSL and non-SSL user requests.

The ARR proxy may run in the same request processing pipeline as the application itself. This may be desirable so as to reduce the complexity of migrating from our older deployment system. It may also be desirable to implement resolution of conflicts between the new and existing HTTP modules in the IIS request lifecycle, as discussed herein.

Figure 5:
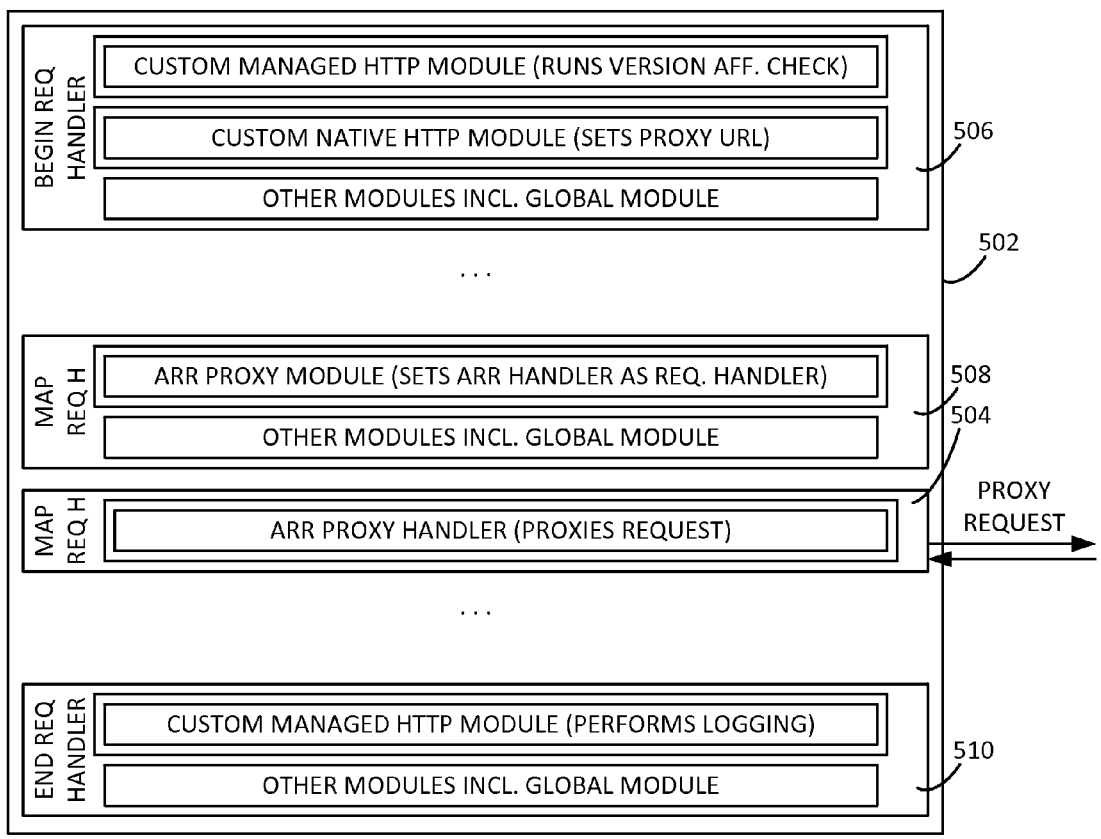
FIG. 5 shows one embodiment of employing ARR module for implementing the techniques of the present application.

FIG. 5 shows one embodiment (502) of a request processing pipeline employed to integrate ARR as a proxy. The affinitized version for a user may be determined by a custom http module during the BeginRequest phase 506 of the request lifecycle. If the version of the service running on the current frontend does not match the user's affinitized version, the request is setup for proxying via ARR. The HttpRequest->SetUrl API which enables changing the request URL and thus set the request up for proxying may be available in the native context. Hence, it is possible to add a custom native module.

During the MapRequestHandler phase 508, the ARR module sees that the request URL has been changed and sets the ARR handler as the request handler. The request processing details can be summarized as follows:

TABLE 1

REQUEST PROCESSING LOGIC

| REQUEST PROCESSING EVENT | ACTION IF REQUEST IS PROXIED |
| --- | --- |
| BeginRequest | Custom managed module determines that the request is to be proxied and passes this information to the custom native module |
| PostBeginRequest | The custom native module sets proxy URL |
| MapRequestHandler | ARR modules sets ARR handler as the request handler |
| ExecuteRequestHandler | ARR handler proxies the request to the proxy URL |
| EndRequest | Response code is inspected to determine proxy errors |

ARR Configuration

In some server system implementations, it may be possible to use the following configuration settings:

preserveHostHeader=true.

It may be desirable for the application to see the original host header on the proxied request instead of the host header modified for the purpose of ARR routing.

reverseRewriteHostInResponseHeaders=false.

In the responses back to the client, ARR may return the location headers as set by the application in case of redirects.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method, comprising:
receiving, at a load balancer computing device, electronic resource metadata identifying a plurality of versions of an electronic resource accessible via a network, each version of the electronic resource being stored at one or more servers within the network;
receiving, at the load balancer computing device, user metadata corresponding to at least one user;
receiving, at the load balancer computing device, a request for access to the electronic resource from the at least one user;
determining, using the load balancer computing device, if the request for access to the electronic resource is versioned or unversioned based at least in part on the user metadata;
based at least in part on determining that the request for access to the electronic resource is unversioned:
calculating, using the load balancer computing device, a version affinitization based at least in part on a unique identifier for the at least one user;
calculating, using the load balancer computing device, a cluster of the one or more servers within the network based at least in part on the unique identifier for the at least one user;
mapping, using the load balancer computing device, a combination of the version affinitization and the cluster to a version of the electronic resource, wherein the mapping changes dynamically as each of the one or more servers in the cluster changes versions of the electronic resource;
identifying, using the load balancer computing device, a first server to service the request according to a set of first metrics including versioning rules based at least in part on the version of the electronic resource and load balancing traffic in the network;
transmitting, using the load balancer computing device, the request to the first server to service the request; and
based at least in part on the first server being unable to service the request, redirecting, using the load balancer computing device, the request to a second server according to a set of second metrics.

2. The method of claim 1 wherein the electronic resource comprises a website, a webpage, a web service, an application, or a database.

3. The method of claim 2 wherein the network comprises the Internet or another network configuration.

4. The method of claim 3 further comprising:
receiving the electronic resource metadata or the user metadata from a datastore.

5. The method of claim 3 further comprising:
receiving the request for unversioned access to the electronic resource.

6. The method of claim 3 wherein the set of first metrics comprise version control rules, metrics regarding percentage of available current versions, metrics regarding load on particular servers hosting available current versions, metrics regarding upgrading of electronic resources, or metrics regarding percentage load on such versions/servers.

7. The method of claim 3 further comprising:
proxying the request to the second server based at least in part on the set of second metrics.

8. The method of claim 7 wherein the set of second metrics comprise version control rules, metrics regarding percentage of available current versions, metrics regarding load on particular servers hosting available current versions, metrics regarding upgrading of electronic resources, or metrics regarding percentage load on such versions/servers.

9. The method of claim 3 further comprising:
stamping the user metadata with version metadata identifying the version of the electronic resource based at least in part on the mapping.

10. The method of claim 9 further comprising:
assigning a first server to service the request according to the mapping.

11. The method of claim 9 further comprising:
dynamically changing the mapping of the version affinitization and the cluster to the version of the electronic resource based at least in part on at least a portion of the set of first metrics.

12. The method of claim 1 further comprising: receiving the request comprising metadata specifying access to the electronic resource.

13. A system, comprising:
a memory device to store instructions; and
a processing device to execute the instructions stored in the memory device to generate a load balancer in communication with a set of servers, each of the set of servers comprising versions of an electronic resource, the load balancer being partitioned into a plurality of versioned Virtual IPs (VIPs) and unversioned VIPs, the versioned VIPs associated with a version of the electronic resource, wherein the load balancer:
receives a request for access to the electronic resource from at least one user;
receives user metadata corresponding to at least one user;
determines whether the request for access to the electronic resource is versioned or unversioned based at least in part on the user metadata;
based at least in part on the request for access to the electronic resource being unversioned:
calculates a version affinitization based at least in part on a unique identifier for the at least one user;
calculates a cluster based at least in part the unique identifier for the at least one user;
maps a combination of the version affinitization and the cluster to a particular version of the electronic resource based at least in part on, wherein the mapping changes dynamically as each of the set of servers in the cluster changes versions of the electronic resource;
assigns the request to a first server hosting the particular version of the electronic resource according to a set of first metrics including versioning rules; and
if the first server determines that it may not be able to handle the request, redirects the request to a second server according to a second set of metrics.

14. The system of claim 13 wherein the load balancer assigns the first server to service the request based at least in part on the mapping.

15. The system of claim 14 wherein said load balancer dynamically changes the mapping of the version affinitization and the cluster according to a metric.

16. The system of claim 15 wherein the metric comprises version control rules, metrics regarding percentage of available current versions, metrics regarding load on particular servers hosting available current versions, metrics regarding upgrading of electronic resources, or metrics regarding percentage load on such versions/servers.

17. The system of claim 13 wherein the load balancer reassigns the request to a second server based on a determination that the first server may not be able to service the request.

18. The system of claim 17 wherein the second set of metrics comprises version control rules, metrics regarding percentage of available current versions, metrics regarding load on particular servers hosting available current versions, metrics regarding upgrading of electronic resources, or metrics regarding percentage load on such versions/servers.

19. A non-transitory computer-readable physical storage media storing instructions that, when executed by a computing device, cause the computing device to perform operations comprising:
- receiving electronic resource metadata identifying a plurality of versions of an electronic resource accessible via a network, each version of the electronic version being stored at one or more servers within the network;
- receiving user metadata corresponding to at least one user to identify at least one of the plurality of versions of the electronic resource accessible to the at least one user;
- receiving a request for access to the electronic resource;
- determining if the request for access to the electronic resource is versioned or unversioned;
- based at least in part on determining that the request for access to the electronic resource is unversioned:
  - calculating a version affinitization based at least in part on a unique identifier for the at least one user;
  - calculating a cluster of the one or more servers within the network based at least in part on the unique identifier for the at least one user;
  - mapping a combination of the version affinitization and the cluster to a version of the electronic resource, wherein the mapping changes dynamically as each of the one or more servers in the cluster changes versions of the electronic resource;
- determining a first server to service the request based at least in part on a set of first metrics comprising version control rules;
- transmitting, using the load balancer computing device, the request to the first server to service the request; and
- if said first server determines that it may not be able to handle the user's request, redirecting the user's request to a second server based at least in part on a set of second metrics.

20. The computer-readable physical storage media of claim 19 wherein the set of first metrics comprises metrics regarding percentage of available current versions, metrics regarding load on particular servers hosting available current versions, metrics regarding upgrading of electronic resources, or metrics regarding percentage load on such versions/servers.

* * * * *